(12) United States Patent
Li et al.

(10) Patent No.: US 11,417,148 B2
(45) Date of Patent: Aug. 16, 2022

(54) HUMAN FACE IMAGE CLASSIFICATION METHOD AND APPARATUS, AND SERVER

(71) Applicant: BEIJING DAJIA INTERNET INFORMATION TECHNOLOGY CO., LTD., Beijing (CN)

(72) Inventors: Xuanping Li, Beijing (CN); Fan Yang, Beijing (CN); Yan Li, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 228 days.

(21) Appl. No.: 16/755,301

(22) PCT Filed: Oct. 11, 2018

(86) PCT No.: PCT/CN2018/109794
§ 371 (c)(1),
(2) Date: Apr. 10, 2020

(87) PCT Pub. No.: WO2019/076227
PCT Pub. Date: Apr. 25, 2019

(65) Prior Publication Data
US 2021/0027048 A1    Jan. 28, 2021

(30) Foreign Application Priority Data
Oct. 20, 2017    (CN) .......................... 201710983963.1

(51) Int. Cl.
*G06K 9/00*        (2022.01)
*G06V 40/16*       (2022.01)
(Continued)

(52) U.S. Cl.
CPC ........... *G06V 40/172* (2022.01); *G06K 9/628* (2013.01); *G06N 3/04* (2013.01); *G06N 3/08* (2013.01)

(58) Field of Classification Search
CPC .. G06K 9/00288; G06K 9/628; G06K 9/6273; G06K 9/4628; G06N 3/04; G06N 3/08; G06N 3/0454
(Continued)

(56) References Cited

U.S. PATENT DOCUMENTS 8,520,906 B1      8/2013  Moon et al.
2014/0341422 A1*  11/2014  Xiong ................... G06K 9/627
                                                    382/103
(Continued)

FOREIGN PATENT DOCUMENTS

CN     103824054 A       5/2014
CN     104143079 A  *   11/2014   ......... G06K 9/00288
(Continued)

OTHER PUBLICATIONS

International Search Report issued by the International Searching Authority (ISA/CN) in PCT Application No. PCT/CN2018/109794 dated Jan. 4, 2019. 6 pages, including English translation.

*Primary Examiner* — Juan A Torres
(74) *Attorney, Agent, or Firm* — Meunier Carlin & Curfman LLC (57) ABSTRACT

A human face image classification method includes: acquiring a human face image to be classified; inputting the human face image into a pre-set convolutional neural network model, and according to intermediate data output by a convolutional layer of the convolutional neural network model, identifying gender information of the human face image; and according to final data output by the convolutional layer of the convolutional neural network model, carrying out pre-set content understanding classification on the human face image in a range defined by the gender information, so that data regarding deciding a classification result output by the convolutional neural network model
(Continued)

comprises a difference attribute for distinguishing between different genders.

16 Claims, 5 Drawing Sheets (51) Int. Cl.
    *G06K 9/62*     (2022.01)
    *G06N 3/04*     (2006.01)
    *G06N 3/08*     (2006.01)

(58) Field of Classification Search
    USPC .......................................................... 382/156
    See application file for complete search history.

(56) References Cited

U.S. PATENT DOCUMENTS

| | | | |
|---|---|---|---|
| 2018/0121748 A1* | 5/2018 | Kwak | G06N 3/08 |
| 2018/0150684 A1* | 5/2018 | Wang | G06K 9/00275 |
| 2020/0097742 A1* | 3/2020 | Ratnesh Kumar | G06N 3/0481 |

FOREIGN PATENT DOCUMENTS

| | | | |
|---|---|---|---|
| CN | 104143079 A | | 11/2014 |
| CN | 105678381 A | | 6/2016 |
| CN | 105718869 A | * | 6/2016 |
| CN | 105718869 A | | 6/2016 |
| CN | 106022317 A | * | 10/2016 |
| CN | 106022317 A | | 10/2016 |
| CN | 106529402 A | | 3/2017 |
| CN | 107742107 A | | 2/2018 |
| WO | 2014180093 A1 | | 11/2014 |
| WO | 2015180101 A1 | | 12/2015 |

* cited by examiner

HUMAN FACE IMAGE CLASSIFICATION METHOD AND APPARATUS, AND SERVER

CROSS REFERENCE TO RELATED APPLICATIONS

This application is a US National Stage of International Application No. PCT/CN 2018/109794, filed on Oct. 11, 2018, which claims priority to Chinese Patent Application No. 201710983963.1, filed with the Chinese patent office, on Oct. 20, 2017 and entitled "Human Face Image Classification Method and Apparatus, and Server", which is hereby incorporated by reference in its entirety.

FIELD

The embodiments of the present disclosure relate to the field of model algorithms, and more particularly relates to a human face image classification method and apparatus, and a server.

BACKGROUND

With the increase of the operational capability of intelligent mobile terminals, the intelligent mobile terminals can carry increasingly complex and powerful application programs. By capturing a face image of a user, and performing data processing on the captured face image, the face image of the user is evaluated or classified according to a data processing result.

In the prior art, a deep learning method is used during comparison and application classification on human face images. The main flow of this method includes: according to a preset work purpose, repeatedly training a convolutional neural network model until the model is convergent; after the convolutional neural network model training is completed, inputting human face images to be classified or processed into the trained convolutional neural network model; classifying or processing, by the convolutional neural network model, the human face images according to a weight ratio learned by the training. It can be seen that the deep learning method trains the model into a system with certain identification and determination capabilities through repeated training.

The inventor of the present disclosure has found in researches that in the prior art, when the images are processed by training the convolutional neural network model, it is only limited to solving the problem of differences between the human face images by considering this problem as a single problem. Since, data that can determine final classification of the human face image do not have data of differentiated attributes of different categories of people, so that the differences in the attributes of the different categories are homogenized, resulting in limited classification accuracy, and the phenomenon of an instable output of the convolutional neural network model occurs.

SUMMARY

The embodiments of the present disclosure provide a human face classification method and apparatus, and an intelligent terminal, which can effectively improve the classification accuracy and are relatively high in stability.

In order to solve the foregoing technical problem, one technical solution used by the embodiment of the present disclosure is providing a human face image classification method, including the following steps:

acquiring a human face image to be classified;

inputting the human face image into a pre-set convolutional neural network model, and identifying gender information of the human face image according to intermediate data output by a convolutional layer of the convolutional neural network model; and carrying out pre-set content understanding classification on the human face image in a range defined by the gender information according to final data output by the convolutional layer of the convolutional neural network model, so that data for deciding a classification result output by the convolutional neural network model includes difference attribute data for distinguishing different genders.

Optionally, the convolutional neural network model includes: a first classification set and a second classification set. The first classification set identifies the gender information of the human face image according to the intermediate data output by the convolutional layer of the convolutional neural network model, and the second classification set carries out the pre-set content understanding classification on the human face image in the range defined by the gender information according to the final data output by the convolutional layer of the convolutional neural network model.

Optionally, the first classification set at least includes two fully connected layers and one classification layer. The first classification set takes intermediate data output by a penultimate convolutional layer in convolutional layers as an input signal. The second classification set includes at least two fully connected layers and one classification layer. The second classification set takes final data output by a last convolutional layer in the convolutional layers as an input signal.

Optionally, the convolutional neural network model is formed by training through the following steps:

acquiring a training sample set marked with gender information and desired classification information;

inputting the training sample set into the convolutional neural network model to train the first classification set until the first classification set is convergent;

inputting the training sample set into the convolutional neural network model after the first classification set is convergent, training the second classification set until the second classification set is convergent; and inputting the training sample set into the convolutional neural network model after the second classification set is convergent, and finely adjusting the first classification set and the second classification set by using a pre-set learning rate until the convolutional neural network model is in a convergent state.

Optionally, inputting the training sample set into the convolutional neural network model to train the first classification set until the first classification set is convergent specifically includes the following steps:

inputting the training sample set into the convolutional neural network model, and acquiring a gender classification result output by the first classification set;

comparing whether the marked gender information is consistent with the gender classification result by using a loss stop function;

repeatedly, cyclically and iteratively updating weights of convolutional layers in front of the first classification set until the marked gender information is consistent with the gender classification result when the marked gender information is inconsistent with the gender classification result; and maintaining the weights of the convolutional layers in front of the first classification set when the marked gender information is consistent with the gender classification result.

Optionally, inputting the training sample set into the convolutional neural network model after the first classification set is convergent, and training the second classification set until the second classification set is convergent includes following steps:

inputting the training sample set into the convolutional neural network model, and acquiring an excitation classification result output by the second classification set;

comparing whether the desired classification information is consistent with the excitation classification result by using the loss stop function;

repeatedly, cyclically and iteratively updating weights of the convolutional layers between the first classification set and the second classification set until the desired classification information is consistent with the excitation classification result when the desired classification information is inconsistent with the excitation classification result; and maintaining the weights of the convolutional layers between the first classification set and the second classification set when the marked gender information is consistent with the gender classification result.

Optionally, after inputting the human face image into the pre-set convolutional neural network model, and identifying the gender information of the human face image according to the intermediate data output by the convolutional layer of the convolutional neural network model, the method further includes following steps:

grading a beauty score of the human face image in the range defined by the gender information according to the final data output by the convolutional layer of the convolutional neural network model, so that data for deciding a beauty score output by the convolutional neural network model includes difference attribute data for distinguishing different genders.

Optionally, the pre-set content understanding classification includes: image similarity comparison, race classification identification, or age identification.

In order to solve the foregoing technical problem, the embodiment of the present disclosure further provides a human face image classification apparatus. The human face image classification apparatus includes:

an acquisition module, configured to acquire a human face image to be classified;

a gender classification module, configured to input the human face image into a pre-set convolutional neural network model, and identify gender information of the human face image according to intermediate data output by a convolutional layer of the convolutional neural network model; and a content understanding classification module, configured to carry out pre-set content understanding classification on the human face image in a range defined by the gender information according to final data output by the convolutional layer of the convolutional neural network model, so that data for deciding a classification result output by the convolutional neural network model includes difference attribute data for distinguishing different genders.

Optionally, the convolutional neural network model includes: a first classification set and a second classification set. The first classification set identifies the gender information of the human face image according to the intermediate data output by the convolutional layer of the convolutional neural network model, and the second classification set carries out the pre-set content understanding classification on the human face image in the range defined by the gender information according to the final data output by the convolutional layer of the convolutional neural network model.

Optionally, the first classification set at least includes two fully connected layers and one classification layer. The first classification set takes intermediate data output by a penultimate convolutional layer in convolutional layers as an input signal. The second classification set includes at least two fully connected layers and one classification layer. The second classification set takes final data output by a last convolutional layer in the convolutional layers as an input signal.

Optionally, the human face image classification apparatus further includes:

a first acquisition module, configured to acquire a training sample set marked with gender information and desired classification information;

a first training submodule, configured to input the training sample set into the convolutional neural network model to train the first classification set until the first classification set is convergent;

a second training submodule, configured to input the training sample set into the convolutional neural network model after the first classification set is convergent, and train the second classification set until the second classification set is convergent; and a third training submodule, configured to input the training sample set into the convolutional neural network model after the second classification set is convergent, and finely adjust the first classification set and the second classification set by using a pre-set learning rate until the convolutional neural network model is in a convergent state.

Optionally, the human face image classification apparatus further includes:

a first classification submodule, configured to input the training sample set into the convolutional neural network model, and acquire a gender classification result output by the first classification set;

a first comparison submodule, configured to compare whether the marked gender information is consistent with the gender classification result by using a loss stop function;

a first processing submodule, configured to repeatedly, cyclically and iteratively update weights of convolutional layers in front of the first classification set until the marked gender information is consistent with the gender classification result when the marked gender information is inconsistent with the gender classification result; and a first maintaining submodule, configured to maintain the weights of the convolutional layers in front of the first classification set when the marked gender information is consistent with the gender classification result.

Optionally, the human face image classification apparatus further includes:

a second classification submodule, configured to input the training sample set into the convolutional neural network model, and acquire an excitation classification result output by the second classification set;

a second comparison submodule, configured to compare whether the desired classification information is consistent with the excitation classification result by using the loss stop function;

a second processing submodule, configured to repeatedly, cyclically and iteratively update weights of convolutional layers between the first classification set and the second classification set until the desired classification information is consistent with the excitation classification result when the desired classification information is inconsistent with the excitation classification result; and a second maintaining submodule, configured to maintain the weights of the convolutional layers between the first classification set and the second classification set when the marked gender information is consistent with the gender classification result.

Optionally, the human face image classification apparatus further includes:

a looks classification submodule, configured to grade a beauty score of the human face image in the range defined by the gender information according to the final data output by the convolutional layer of the convolutional neural network model, so that data for deciding a beauty score output by the convolutional neural network model includes difference attribute data for distinguishing different genders.

Optionally, the pre-set content understanding classification includes: image similarity comparison, race classification identification, or age identification.

In order to solve the foregoing technical problem, the embodiment of the present disclosure further provides a server, including:
one or more processors;
a memory;
one or more application programs, wherein the one or more application programs are stored in the memory and configured to be executed by the one or more processors. The one or more application programs are configured to execute any one of the above-mentioned human face image classification methods.

In order to solve the foregoing technical problem, the embodiment of the present disclosure further provides a computer readable storage medium configured to store a computer program. The computer program is executed by a processor to implement: any one of the above-mentioned human face image classification methods.

In order to solve the foregoing technical problem, the embodiment of the present disclosure further provides a computer program product. The computer program product, when operated, is configured to implement: any one of the above-mentioned human face image classification methods.

The embodiments of the present disclosure have the beneficial effects that during the classification of the human face image by using the convolutional neural network model, firstly, the gender information of the human face image is classified according to the intermediate data output by the convolutional layer of the convolutional neural network model, so as to acquire the gender classification information of the human face image. After the gender classification information of the human face image is acquired, the content understanding classification is carried out on the human face image for pre-set purpose according to the final data output by the convolutional layer. At this time, since the gender information of the human face image has been confirmed, during the content understanding classification of the human face image, the convolutional neural network model uses a mode of combining unique features and conventional features of corresponding gender information to evaluate or compare the human face image, thus highlighting the gender differentiation in a final output classification result. Meanwhile, due to the reflection of the gender feature, the model can classify people of different genders by using corresponding standards, which subdivides the classification standards, improves the classification accuracy and also improves the stability of the output of the convolutional neural network model.

BRIEF DESCRIPTION OF THE DRAWINGS

In order to describe the technical solutions in the embodiments of the present disclosure more clearly, accompanying drawings required to be used in the embodiments will be briefly introduced below. Apparently, the drawings in the descriptions below are only some embodiments of the present disclosure. Those skilled in the art can also obtain other drawings according to these drawings without creative work.

DETAILED DESCRIPTION OF THE EMBODIMENTS

In order to make those skilled in the art better understand the solutions of the present disclosure, the technical solutions in the embodiments of the present disclosure will be described clearly and completely in conjunction with the accompanying drawings in the embodiments of the present disclosure.

Some processes described in the description and claims of the present disclosure and in the above drawings include a plurality of operations appearing in a specific order. However, it should be clearly understood that these operations may be executed or executed in parallel not in accordance with the order herein. The sequence numbers of the operations, such as 101 and 102, are only used to distinguish the various different operations. The sequence numbers themselves do not represent any order of execution. In addition, these processes may include more or fewer operations that may be executed in order or in parallel. It should be noted that the descriptions such as "first" and "second" herein are used to distinguish different messages, devices, modules, etc., and do not represent the order, nor do they limit that "first" and "second" are different types.

The technical solutions in the embodiments of the present disclosure will be described clearly and completely below in conjunction with the drawings in the embodiments of the present disclosure. Obviously, the embodiments described herein are only part of the embodiments of the present disclosure, not all the embodiments. Based on the embodiments in the present disclosure, all other embodiments obtained by those skilled in the art without creative work shall fall within the protection scope of the present disclosure.

Embodiment

A basic structure of a convolutional neural network includes two layers. One layer is a feature extraction layer. An input of each neuron is connected with a local acceptance domain of the previous layer and extracts a local feature. Once the local feature is extracted, a position relationship between it and other features is also determined. The other layer is a feature mapping layer. Each computing layer of a network is composed of a plurality of feature mappings. Each feature mapping is a plane, and weights of all neurons on the plane are equal. A feature mapping structure uses a sigmoid function with a small influence function kernel as an activation function of the convolutional network, so that the feature mapping has displacement invariance. In addition, since the neurons on a mapping plane share a weight, the number of free parameters of the network is reduced. Each convolutional layer in the convolutional neural network is immediately followed by a computing layer configured to calculate a local average and carry out two-time extraction. This unique two-time feature extraction structure reduces the feature resolution.

The convolutional neural network is mainly configured to identify two-dimensional graphics with invariance to displacement, scaling, and other forms of distortions. Since a feature detection layer of the convolutional neural network is learnt through training data, when the convolutional neural network is used, explicit feature extraction is avoided, and the feature detection layer implicitly learns from the training data. Furthermore, since the neurons on the same feature mapping plane have the same weight, the network can realize parallel learning, which is also a great advantage of the convolutional network compared to a network formed by connecting the neurons to each other.

A convolutional neural network model is composed of: convolutional layers, fully connected layers, and classification layers. The convolutional layers are configured to sense a part of a human face image, and are usually connected in a cascaded manner. The convolutional layers located closer to the back part in the cascade can sense more global information.

The fully connected layers function as "classifier" in the entire convolutional neural network. If operations of such as the convolutional layers, the pooling layers and the activation function layers are to map original data to a hidden layer feature space, the fully connected layers play a role of mapping a learned "distributed feature representation" to a sample labeling space. The fully connected layers are connected to the output positions of the convolutional layer and can sense global features of the detected human face image.

The classification layer is connected to the output end of the fully connected layer, and each data output by the classification layer represents a probability that the detected human face image belongs to this category.

Figure 1:
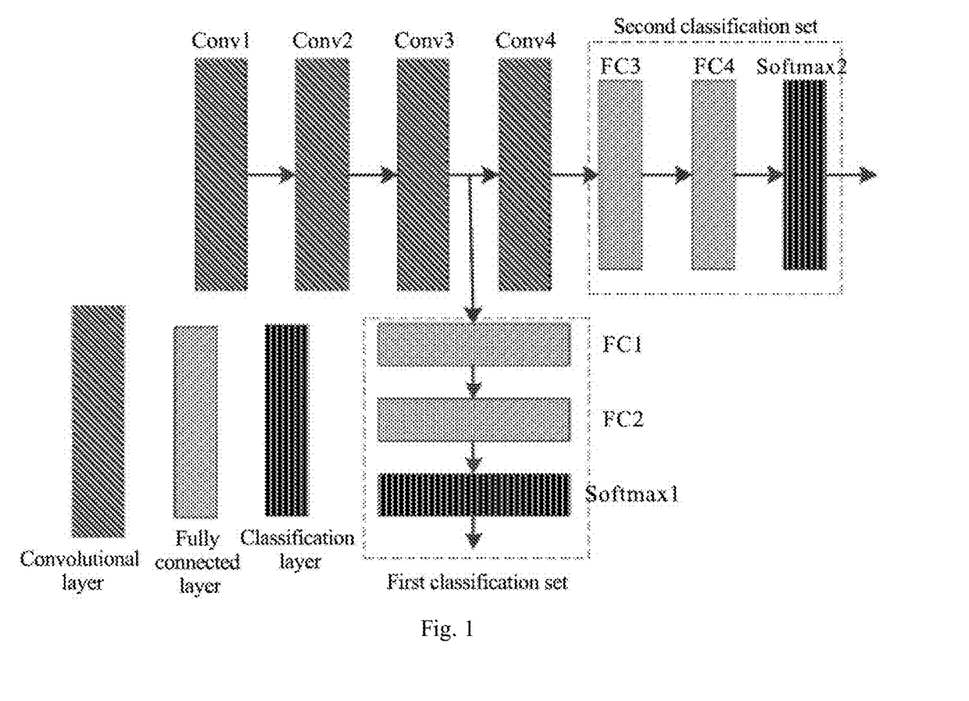
FIG. 1 is a schematic diagram of constitution of a convolutional neural network model according to the embodiment of the present disclosure.

Referring to FIG. 1, FIG. 1 is a schematic diagram of constitution of a convolutional neural network model according to the present embodiment.

As shown in FIG. 1, the convolutional neural network model includes:
a first classification set and a second classification set. The first classification set identifies gender information of a human face image according to intermediate data output by convolutional layer of the convolutional neural network model, and the second classification set carries out content understanding classification on the human face image in a range defined by the gender information according to final data output by the convolutional layer of the convolutional neural network model.

The first classification set at least includes two fully connected layers and one classification layer. The first classification set takes the intermediate data output by the penultimate convolutional layer in the convolutional layers as an input signal. The second classification set includes at least two fully connected layers and one classification layer. The second classification set takes the final data output by the last convolutional layer in the convolutional layers as an input signal.

Specifically, the convolutional neural network model includes: four convolutional layers connected in a cascaded manner, the first classification set and the second classification set. The first classification set includes: two fully connected layers (FC1 and FC2) and one classification layer (softmax1). The two fully connected layers are connected in a cascaded manner, and take the data output by the third convolutional layer as an input signal, and the classification layer takes data output by the last fully connected layer as an input signal. The second classification set includes: two fully connected layers (FC3 and FC4) and one classification layer (softmax2). The two fully connected layers are connected in a cascaded manner, and take the data output by the fourth convolutional layer as an input signal, and the classification layer takes data output by the last fully connected layer as an input signal.

The constitution of the convolutional neural network model is not limited to this. The convolutional neural network model may be composed of (not limited to): five, six, seven or more convolutional layers according to different specific application scenarios, and the fully connected layers and the classification layers constituting the convolutional neural network model may also be increased according to different classification applications. For example, during the content understanding classification, when difference attributes of different age groups need to be added, one classification set may be added, i.e., two fully connected layers and one classification layer are added.

The connection position between the first classification set and the convolutional layer is not fixed at the output of the last convolutional layer. The first classification set may be connected to the output of any one of the convolutional layers according to different processing capacities and processing time when the above requirement is lowered.

For gender classification, since there are fewer classification categories, and genders are more recognizable, data with a lower degree of globalization may be used for classification, the first classification set carries out the classification by using the intermediate data output by the convolution layer. The content understanding classification relates to more detailed classification, so that data with a higher degree of globalization is needed for classification, so as to improve the classification accuracy. Therefore, the second classification set carries out the classification by using the final data output by the convolution layer.

Figure 2:
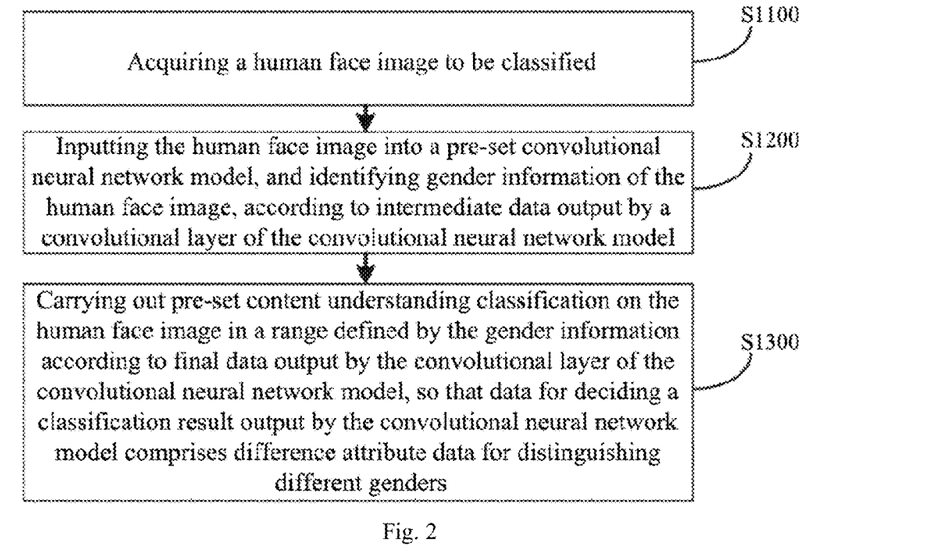
FIG. 2 is a schematic diagram of a basic flow of a human face image classification method implemented by using a convolutional neural network model according to the embodiment of the present disclosure.

Referring to FIG. 2, FIG. 2 is a schematic diagram of a basic flow of a human face image classification method implemented by using a convolutional neural network model according to the present embodiment.

As shown in FIG. 2, the human face image classification method includes the following steps that:

S1100, acquiring a human face image to be classified.

The human face image may be acquired in real time through a shooting apparatus, may be an existing photo uploaded by a user, or may be image data acquired from a video in frames, and the like.

S1200, inputting the human face image into a pre-set convolutional neural network model, and identifying gender information of the human face image according to intermediate data output by convolutional layer of the convolutional neural network model.

The acquired human face image is input into the trained convolutional neural network model. The first classification set firstly identifies the gender of the human face image according to the intermediate data output by the penultimate convolutional layer.

The first classification set is trained to carry out gender classification on the human face image. The human face image is input into the convolutional neural network model. The convolutional layers in front of the first classification set sense local features of the human face image in a progressive manner, and the data output by the convolutional layer is converted in the first classification set into a convolution with a convolutional kernel of 1×1. The classification layer calculates probabilities of different genders of the human face image according to an output of the fully connected layer, and the gender with the relatively large probability is used as a gender attribute of the human face image. For example, if the probabilities of male and female of the input human face image are [0.8, 0.2] in a computing result of the first classification set, it is defined that the human in the human face image is male.

S1300, carrying out pre-set content understanding classification on the human face image in a range defined by the gender information according to final data output by the convolutional layer of the convolutional neural network model, so that data for deciding a classification result output by the convolutional neural network model includes difference attribute data for distinguishing different genders.

After the first classification set confirms the gender of the human in the human face image, the second classification set in the convolutional neural network model acquires the data output by the last convolutional layer. The fully connected layers in the second classification set convert the final data output by the convolutional layer into a convolution with a convolutional kernel of 1×1, and the classification layer calculates the content understanding classification of the human face image according to the output of the fully connected layer. The content understanding classification includes (not limited to): image similarity comparison, race classification identification, or age identification. For example, during comparisons of the human face images, if the similarities between the input human face image and a plurality of comparison images are respectively [0.7, 0.15, 0.05, 0.1], the human face image is most similar to the first comparison image.

The gender of the human face image has been classified during the content understanding classification; the convolutional neural network model has learnt difference features between different genders during training. For example, in terms of the same feature, in aesthetic appreciation, for different genders, there are different aesthetic perspectives on the thickness of the eyebrows. Generally, it is considered that thin eyebrows of women are a beautiful feature, while thick eyebrows of men are a beautiful feature. During the training of the convolutional neural network model, the convolutional neural network model learns this judgment standard through expected settings. During the content understanding classification, the eyebrows in the human face image are classified and identified according to the acquired gender classification. For example, when the content understanding classification is to score the looks of the human face, the gender is determined at first, and then the looks level of the eyebrows in the gender is judged.

Since different genders have different unique difference features, during the training, the convolutional neural network model learns the difference features of different genders (such as: women have narrower faces, and men have wider faces; women have larger eyes than men; and women have longer hairs). During image classification, after the gender attribute of the human face image is determined, the human face image may be evaluated by using the learnt difference feature.

During the classification of the human face image by using the convolutional neural network model in the above implementation mode, firstly, the gender information of the human face image is classified according to the intermediate data output by the convolutional layer of the convolutional neural network model, so as to acquire the gender classification information of the human face image. After the gender classification information of the human face image is acquired, the content understanding classification is carried out on the human face image for pre-set purpose according to the final data output by the convolutional layer. At this time, since the gender information of the human face image has been confirmed, during the content understanding classification of the human face image, the convolutional neural network model uses a mode of combining unique features and conventional features of a corresponding gender to evaluate or compare the human face image, thus highlighting the gender differentiation in a final output classification result. Meanwhile, due to the reflection of the gender feature, the model can classify people of different genders by using corresponding standards, which subdivides the classification standards, improves the classification accuracy and also improves the stability of the output of the convolutional neural network model.

Figure 3:
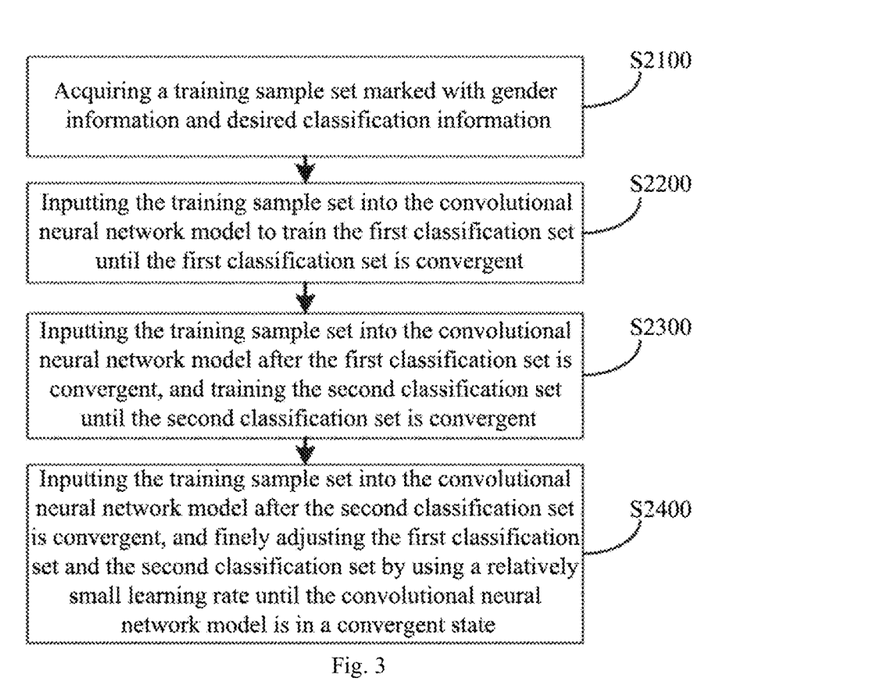
FIG. 3 is a schematic diagram of a basic flow of a convolutional neural network model training method according to the embodiment of the present disclosure.

Referring to FIG. 3, FIG. 3 is a schematic diagram of a basic flow of a convolutional neural network model training method according to the present embodiment.

As shown in FIG. 3, the training method includes the following steps that:

S2100, acquiring a training sample set marked with gender information and desired classification information.

A batch of human face images is collected. The gender information of the human face in the human face images are marked at first. Then, according to different genders, the looks levels of the human face images are marked as four types including good-looking, intermediately good-looking, intermediately bad-looking and bad-looking (The content understanding classification is described by taking the beauty scores of the human face images for example. In different application scenarios, when the content understanding classification is the race, the classification includes yellow race, white race, and black race; and when the content understanding classification is the age, the classification may be age stages in years.)

The gender information and the desired classification information are manually made according to the identification and mainstream evaluation standards of the corresponding human face images, and are expectations of personnel for the human face image output results of the convolutional neural network model.

S2200, inputting the training sample set into the convolutional neural network model to train the first classification set until the first classification set is convergent.

The collected training sample set is input into the convolutional neural network model to train the first classification set of the convolutional neural network model, i.e., to train the gender classification accuracy of the convolutional neural network model. When a training result indicates that the gender classification accuracy of the first classification set meets a pre-set standard, e.g., with 99 percent accuracy, the training of the first classification set is completed, and the first training set is trained to be convergent.

S2300, inputting the training sample set into the convolutional neural network model after the first classification set is convergent, and training the second classification set until the second classification set is convergent.

After the training of the first classification set is ended, the training sample set is re-input into the convolutional neural network model to train the second classification set of the convolutional neural network model, i.e., to train the content understanding classification of the convolutional neural network model. When a training result indicates that the content understanding classification of the second classification set meets a pre-set standard, e.g., with 99 percent accuracy, the training of the second classification set is completed, and the second training set is trained to be convergent.

S2400, inputting the training sample set into the convolutional neural network model after the second classification set is convergent, and finely adjusting the first classification set and the second classification set by using a pre-set learning rate until the convolutional neural network model is in a convergent state.

After the first and second classification sets are both trained to be convergent, the training sample set is re-input into the convolutional neural network model, and the weights of the first classification set and the second classification set are finely adjusted by using the pre-set learning rate. Since the weight parameters of the first classification set and the second classification set are determined through relatively independent training, the first classification set and the second classification set need to be further coordinately trained under unified data. The training sample set is re-input into the convolutional neural network model, a relatively small learning rate is used (i.e., the weights of the first classification set, the second classification set and the convolutional layers are adjusted by a relatively small rate) until the content understanding classification accuracy and gender classification accuracy output by the whole convolutional neural network model are both 99 percent, the convolutional neural network model is in the convergent state. The pre-set learning rate is a relatively small pre-set learning rate.

The weights of the first classification set and the second classification set are separately trained, and then the first classification set and the second classification set are coordinately trained after being stabilized respectively until the whole convolutional neural network model is convergent, so that the convolutional neural network model learns the gender classification of the human face images, and is also trained to learn the content understanding classification.

Figure 4:
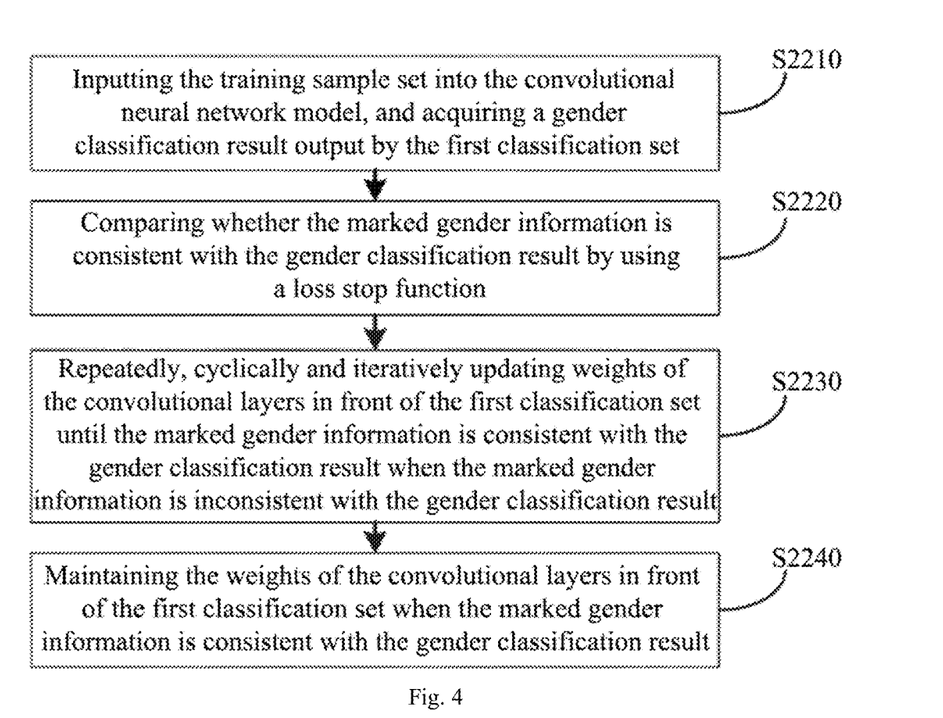
FIG. 4 is a flow diagram of training a first classification set of the human face image classification method according to the embodiment of the present disclosure.

Specifically, referring to FIG. 4, a flow diagram of training the first classification set of the human face image classification method according to the present embodiment is illustrated.

As shown in FIG. 4, after the step S2200, the following steps are further included.

S2210, inputting the training sample set into the convolutional neural network model, and acquiring a gender classification result output by the first classification set.

The training sample set is input into the convolutional neural network model, and the gender classification result output by the first classification set is acquired.

S2220, comparing whether the marked gender information is consistent with the gender classification result by using a loss stop function.

The loss stop function is a detection function configured to detect whether model classification reference information in the convolutional neural network model is consistent with desired classification judgment information.

The loss stop function compares whether the marked gender information of the human face image in the input training sample set is consistent with the gender classification result. The next human face image is trained if they are consistent, and the step S2230 is executed if they are inconsistent.

S2230, repeatedly, cyclically and iteratively updating weights of the convolutional layers in front of the first classification set until the marked gender information is consistent with the gender classification result when the marked gender information is inconsistent with the gender classification result.

When the output classified gender information of the convolutional neural network model is inconsistent with a desired result of the marked gender information, the weights in the convolutional neural network model need to be corrected. Specifically, the weights of the convolutional layers in front of the first classification set are adjusted to enable the output gender classification result of the first classification set to be the same as the desired result of the marked gender information.

S2240, maintaining the weights of the convolutional layers in front of the first classification set when the marked gender information is consistent with the gender classification result.

When the marked gender information is consistent with the gender classification result, the weights of the convolutional layers in front of the first classification set are maintained. That is, when the second classification set is independently trained, the weight of the convolutional layer in front of the first classification set is no longer adjusted.

Figure 5:
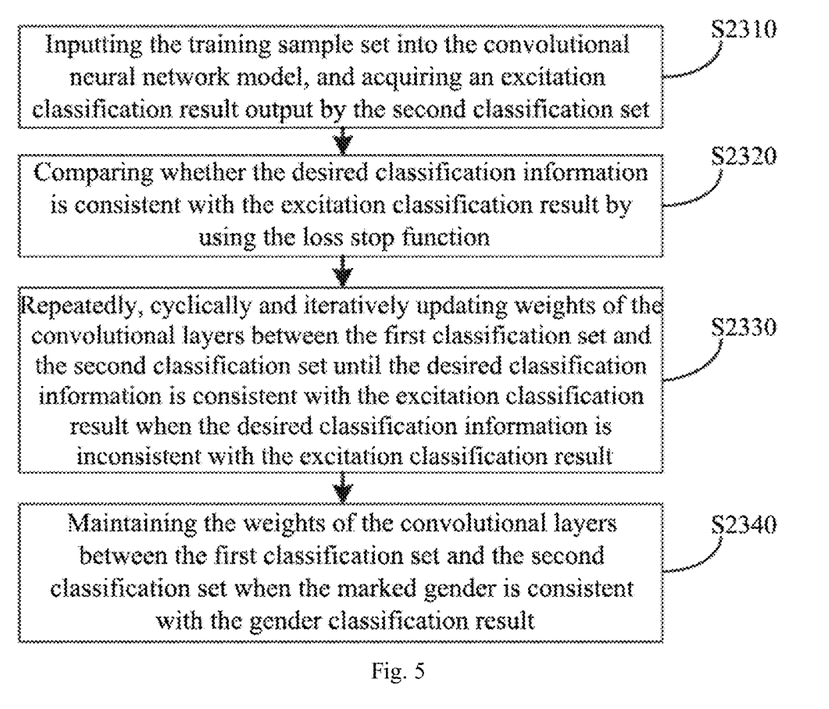
FIG. 5 is a flow diagram of training a second classification set of the human face image classification method according to the embodiment of the present disclosure.

Specifically, referring to FIG. 5, FIG. 5 is a flow diagram of training the second classification set of the human face image classification method according to the present embodiment.

As shown in FIG. 5, after the step S2300, the following steps are further included.

S2310, inputting the training sample set into the convolutional neural network model, and acquiring an excitation classification result output by the second classification set.

The training sample set is input into the convolutional neural network model, and the excitation classification result output by the second classification set is acquired.

S2320, comparing whether the desired classification information is consistent with the excitation classification result by using the loss stop function.

The desired classification information refers to an artificial definition of the human face image in the training sample set. If the human face image in the training sample set is artificially scored to be 90, this score is a desired value artificially provided to this human face image, that is, the convolutional neural network model is expected to score this human face image as 90.

The excitation classification result refers to a classification result output by the second classification set in response to the input human face image. When the second classification set is convergent, the classification result output by it is close to the desired classification result. When the second classification set is dispersed, the excitation classification result is a random number. When a Sigmoid activation function is used in the convolutional neural network model, the excitation classification result is a random number between 0 and 1.

The loss stop function compares whether the desired classification information of the human face image in the input training sample set is consistent with the excitation classification result. The next human face image is trained if they are consistent, and the step S2330 is executed if they are inconsistent.

S2330, repeatedly, cyclically and iteratively updating weights of the convolutional layers between the first classification set and the second classification set until the desired classification information is consistent with the excitation classification result when the desired classification information is inconsistent with the excitation classification result.

When the excitation classification result output by the second classification set is inconsistent with the desired classification information, the weights of the convolutional layers located between the first classification set and the second classification set needs to be corrected to enable the excitation classification result output by the second classification set to be the same as the desired classification information.

S2340, maintaining the weights of the convolutional layers between the first classification set and the second classification set when the marked gender information is consistent with the gender classification result.

When the excitation classification result is consistent with the desired classification information, the weights of the convolutional layers between the first classification set and the second classification set are maintained.

In some implementation modes, the convolutional neural network model is trained to score the looks of the human face image.

Specifically, the looks of the human face image is scored in the range defined by the gender information according to the final data output by the convolutional layer of the convolutional neural network model, so that data for deciding a beauty score output by the convolutional neural network model includes difference attribute data for distinguishing different genders.

The training of the convolutional neural network model for scoring the looks of the human face image is carried out in accordance with the following method.

A batch of human face images is collected. The genders of the human faces in the human face images are marked respectively at first. Then, the looks levels of the human face images are marked according to different genders according to four types including good-looking, intermediately good-looking, intermediately bad-looking and bad-looking.

A convolutional neural network model is constructed and the network includes a convolutional network, a fully connected network and a classification network. The third convolutional layer is connected to two fully connected layers and then connected to one classifier (softmax layer) to detect the gender of the human face. The fourth convolutional layer is connected to two fully connected layers and then connected to one classifier (softmax layer) to detect the looks of the human face.

Referring to FIG. 1, the neural network model is trained by using the marked training data and the built convolutional neural network model. During model training, the conv1, the conv2, the conv3, the FC1, the FC2 and the softmax1 are trained at first, so the model may be trained to learn a gender feature. After the gender model is convergent, the weights of the conv1, the conv2 and the conv3 are maintained, and the conv4, the FC3, the FC4 and the softmax2 are trained, so the model may learn a looks feature. After the looks model is convergent, the conv1, the conv2, the conv3, the conv4, the FC3, the FC4 and the softmax2 are trained simultaneously, and the looks model is finely adjusted by using the relatively small learning rate, so as to acquire an accurate looks classification network. The convolutional neural network model forecasts a looks category of the human face in the human face image, and a probability value corresponding to the looks category. The looks of the human face is estimated according to the looks category and the corresponding probability value, and is mapped with a score of 0 to 100. A higher score indicates a more good-looking human face. If the probability values corresponding to the good-looking, intermediately good-looking, intermediately bad-looking and bad-looking output by the convolutional neural network model are [0.7, 0.12, 0.15, 0.03], the human face in the human face image is at the good-looking level, and has a beauty score of 70.

In order to solve the foregoing technical problem, the embodiment of the present disclosure further provides a human face image classification apparatus.

Figure 6:
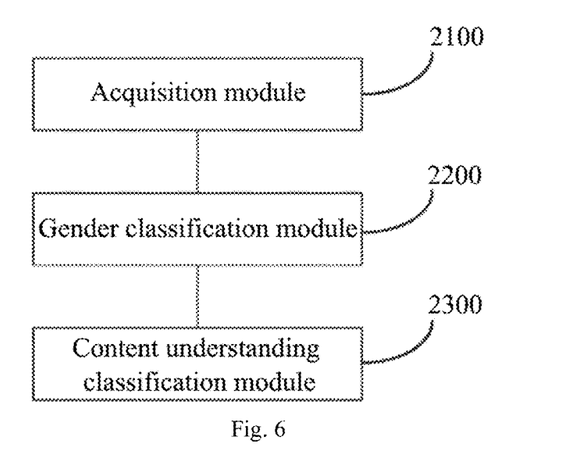
FIG. 6 is a schematic diagram of a basic structure of a human face image classification apparatus according to the embodiment of the present disclosure.

Specifically referring to FIG. 6, FIG. 6 is a schematic diagram of a basic structure of the human face image classification apparatus according to the present embodiment.

As shown in FIG. 6, the human face image classification apparatus includes: an acquisition module 2100, a gender classification module 2200 and a content understanding classification module 2300. The acquisition module 2100 is configured to acquire a human face image to be classified. The gender classification module 2200 is configured to input the human face image into a pre-set convolutional neural network model, and identify gender information of the human face image according to intermediate data output by a convolutional layer of the convolutional neural network model. The content understanding classification module 2300 is configured to carry out pre-set content understanding classification on the human face image in a range defined by the gender information according to final data output by the convolutional layer of the convolutional neural network model, so that data for deciding a classification result output by the convolutional neural network model includes difference attribute data for distinguishing different genders.

During the classification of the human face image by using the convolutional neural network model, the human face image classification apparatus firstly classifies the gender information of the human face image according to the intermediate data output by the convolutional layer of the convolutional neural network model, and acquires the gender classification information of the human face image. After the gender classification information of the human face image is acquired, the content understanding classification is carried out on the human face image for pre-set purpose according to the final data output by the convolutional layer. At this time, since the gender information of the human face image has been confirmed, during the content understanding classification of the human face image, the convolutional neural network model uses a mode of combining unique features and conventional features of a corresponding gender to evaluate or compare the human face image, thus highlighting the gender differentiation in a final output classification result. Meanwhile, due to the reflection of the gender feature, the model can classify people of different genders by using corresponding standards, which subdivides the classification standards, improves the classification accuracy and also improves the stability of the output of the convolutional neural network model.

In some implementation modes, the convolutional neural network model includes: a first classification set and a second classification set. The first classification set identifies the gender information of the human face image according to the intermediate data output by the convolutional layer of the convolutional neural network model, and the second classification set carries out the pre-set content understanding classification on the human face image in the range defined by the gender information according to final data output by the convolutional layer of the convolutional neural network model.

In some implementation modes, the first classification set at least includes two fully connected layers and one classification layer. The first classification set takes the intermediate data output by a penultimate convolutional layer in convolutional layers as an input signal. The second classification set includes at least two fully connected layers and one classification layer. The second classification set takes final data output by a last convolutional layer in the convolutional layers as an input signal.

In some implementation modes, the human face image classification apparatus further includes: a first acquisition module, a first training submodule, a second training submodule and a third training submodule. The first acquisition module is configured to acquire a training sample set marked with gender information and desired classification information. The first training submodule is configured to input the training sample set into the convolutional neural network model to train the first classification set until the first classification set is convergent.

The second training submodule is configured to input the training sample set into the convolutional neural network model after the first classification set is convergent, and to train the second classification set until the second classification set is convergent. The third training submodule is configured to input the training sample set into the convolutional neural network model after the second classification set is convergent, and finely adjusts the first classification set and the second classification set by using a pre-set learning rate until the convolutional neural network model is in a convergent state.

In some implementation modes, the human face image classification apparatus further includes: a first classification submodule, a first comparison submodule, a first processing submodule and a first maintaining submodule. The first classification submodule is configured to input the training sample set into the convolutional neural network model, and acquire a gender classification result output by the first classification set. The first comparison submodule is configured to compare whether the marked gender information is consistent with the gender classification result by using a loss stop function. The first processing submodule is configured to repeatedly, cyclically and iteratively update weights of the convolutional layers in front of the first classification set until the marked gender information is consistent with the gender classification result when the marked gender information is inconsistent with the gender classification result. The first maintaining submodule is configured to maintain the weights of the convolutional layers in front of the first classification set when the marked gender information is consistent with the gender classification result.

In some implementation modes, the human face image classification apparatus further includes: a second classification submodule, a second comparison submodule, a second processing submodule and a second maintaining submodule. The second classification submodule is configured to input the training sample set into the convolutional neural network model, and acquire an excitation classification result output by the second classification set. The second comparison submodule is configured to compare whether the desired classification information is consistent with the excitation classification result by using the loss stop function. The second processing submodule is configured to repeatedly, cyclically and iteratively update weights of the convolutional layers between the first classification set and the second classification set until the desired classification information is consistent with the excitation classification result when the desired classification information is inconsistent with the excitation classification result. The second maintaining submodule is configured to fix the weight of the convolutional layer between the first classification set and the second classification set when the marked gender is consistent with the gender classification result.

In some implementation modes, the human face image classification apparatus further includes a looks classification submodule which is configured to grade a beauty score of the human face image in the range defined by the gender information according to the final data output by the convolutional layer of the convolutional neural network model, so that data for deciding a beauty score output by the convolutional neural network model includes difference attribute data for distinguishing different genders.

In some implementation modes, the pre-set content understanding classification includes: image similarity comparison, race classification identification, or age identification.

The present embodiment further provides a server. Specifically referring to FIG. 7, FIG. 7 is a schematic diagram of a basic structure of the server according to the present embodiment.

Figure 7:
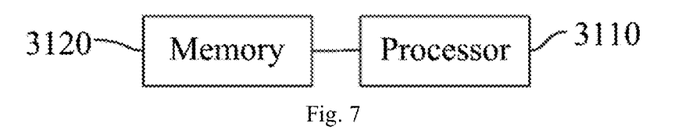
FIG. 7 is a schematic diagram of a basic structure of a server according to the embodiment of the present disclosure.

As shown in FIG. 7, the server includes: one or more processors 3110 and a memory 3120; one or more application programs. The one or more application programs are stored in the memory, and are configured to be executed by the one or more processors. The one or more application programs are configured to:

acquire a human face image to be classified;

input the human face image into a pre-set convolutional neural network model, and identify gender information of the human face image according to intermediate data output by a convolutional layer of the convolutional neural network model; and carry out pre-set content understanding classification on the human face image in a range defined by the gender information according to final data output by the convolutional layer of the convolutional neural network model, so that data for deciding a classification result output by the convolutional neural network model includes difference attribute data for distinguishing different genders.

During the classification of the human face image by using the convolutional neural network model, the server firstly classifies the gender information of the human face image according to the intermediate data output by the convolutional layer of the convolutional neural network model, and acquires the gender classification information of the human face image. After the gender classification information of the human face image is acquired, the content understanding classification is carried out on the human face image for pre-set purpose according to the final data output by the convolutional layer. At this time, since the gender information of the human face image has been confirmed, during the content understanding classification of the human face image, the convolutional neural network model uses a mode of combining unique features and conventional features of a corresponding gender to evaluate or compare the human face image, thus highlighting the gender differentiation in a final output classification result. Meanwhile, due to the reflection of the gender feature, the model can classify people of different genders by using corresponding standards, which subdivides the classification standards, improves the classification accuracy and also improves the stability of the output of the convolutional neural network model.

It should be noted that in the present embodiment, all programs configured to implement the human face image classification method in the present embodiment are stored in the memory of the server, and the processors may call the programs in the memory to implement the functions listed in any one of the above-mentioned human face image classification methods. The functions realized by the server have been described in detail in the human face image classification method in the present embodiment, and thus are not repeated here in more details.

The embodiment of the present disclosure further provides a computer readable storage medium configured to store a computer program. The computer program is executed by a processor to implement: any one of the above-mentioned human face image classification methods.

After the computer program stored in the computer readable storage medium provided by the embodiment of the present disclosure is executed by the processor of the server, during the classification of the human face image by using the convolutional neural network model, the server firstly classifies the gender information of the human face image according to the intermediate data output by the convolutional layer of the convolutional neural network model, and acquires the gender classification information of the human face image. After the gender classification information of the human face image is acquired, the content understanding classification is carried out on the human face image for pre-set purpose according to the final data output by the convolutional layer. At this time, since the gender information of the human face image has been confirmed, during the content understanding classification of the human face image, the convolutional neural network model uses a mode of combining unique features and conventional features of a corresponding gender to evaluate or compare the human face image, thus highlighting the gender differentiation in the finally output classification result. Meanwhile, due to the reflection of the gender feature, the model can classify people of different genders by using corresponding standards, which subdivides the classification standards, improves the classification accuracy and also improves the stability of the output of the convolutional neural network model.

The embodiment of the present disclosure further provides a computer program product. The computer program product, when operated, is configured to implement: any one of the above-mentioned human face image classification methods.

After the computer program product provided by the embodiment of the present disclosure is executed by the processor of the server, during the classification of the human face image by using the convolutional neural network model, the server firstly classifies the gender information of the human face image according to the intermediate data output by the convolutional layer of the convolutional neural network model, and acquires the gender classification information of the human face image. After the gender classification information of the human face image is acquired, the content understanding classification is carried out on the human face image for pre-set purpose according to the final data output by the convolutional layer. At this time, since the gender information of the human face image has been confirmed, during the content understanding classification of the human face image, the convolutional neural network model uses a mode of combining unique features and conventional features of a corresponding gender to evaluate or compare the human face image, thus highlighting the gender differentiation in a final output classification result. Meanwhile, due to the reflection of the gender feature, the model can classify people of different genders by using corresponding standards, which subdivides the classification standards, improves the classification accuracy and also improves the stability of the output of the convolutional neural network model.

As for the computer readable storage medium and computer program product embodiments, since they are basically similar to the method embodiment, they are described relatively simply, and the relevant parts may refer to part of the illustration of the method embodiment.

It should be noted that the preferred embodiments of the present disclosure are provided in the description and the accompanying drawings of the present disclosure. However, the present disclosure can be implemented in many different forms and is not limited to the embodiments described in this description. These embodiments are not intended as an additional limitation to the content of the present disclosure, and these embodiments are provided to make the understanding of the content of the present disclosure more thorough and comprehensive. In addition, the above various technical features continue to be combined with each other to form various embodiments not listed above, and shall all fall within the scope described in the description of the present disclosure. Further, those of ordinary skill in the art can make improvements or changes according to the above descriptions. All these improvements and changes shall fall within the protection scope of the appended claims of the present disclosure.

The invention claimed is:

1. A human face image classification method, comprising following steps:
   acquiring a human face image to be classified;
   inputting the human face image into a pre-set convolutional neural network model, and identifying gender information of the human face image according to intermediate data output by a convolutional layer of the convolutional neural network model; and
   carrying out pre-set content understanding classification on the human face image in a range defined by the gender information according to final data output by the convolutional layer of the convolutional neural network model, so that data for deciding a classification result output by the convolutional neural network model comprises difference attribute data for distinguishing different genders;
   wherein the convolutional neural network model comprises: a first classification set and a second classification set;
   the first classification set identifies the gender information of the human face image according to the intermediate data output by the convolutional layer of the convolutional neural network model; and the second classification set carries out the pre-set content understanding classification on the human face image in the range defined by the gender information according to the final data output by the convolutional layer of the convolutional neural network model.

2. The human face image classification method according to claim 1, wherein the first classification set at least comprises two fully connected layers and one classification layer; the first classification set takes intermediate data output by a penultimate convolutional layer in convolutional layers as an input signal; the second classification set comprises at least two fully connected layers and one classification layer; and the second classification set takes final data output by a last convolutional layer in the convolutional layers as an input signal.

3. The human face image classification method according to claim 1, wherein the convolutional neural network model is formed by training through following steps:
    acquiring a training sample set marked with gender information and desired classification information;
    inputting the training sample set into the convolutional neural network model to train the first classification set until the first classification set is convergent;
    inputting the training sample set into the convolutional neural network model after the first classification set is convergent, training the second classification set until the second classification set is convergent; and
    inputting the training sample set into the convolutional neural network model after the second classification set is convergent, and finely adjusting the first classification set and the second classification set by using a pre-set learning rate until the convolutional neural network model is in a convergent state.

4. The human face image classification method according to claim 3, wherein inputting the training sample set into the convolutional neural network model to train the first classification set until the first classification set is convergent comprises following steps:
    inputting the training sample set into the convolutional neural network model, and acquiring a gender classification result output by the first classification set;
    comparing whether the marked gender information is consistent with the gender classification result by using a loss stop function;
    repeatedly, cyclically and iteratively updating weights of convolutional layers in front of the first classification set until the marked gender information is consistent with the gender classification result when the marked gender information is inconsistent with the gender classification result; and
    maintaining the weights of the convolutional layers in front of the first classification set when the marked gender information is consistent with the gender classification result.

5. The human face image classification method according to claim 4, wherein inputting the training sample set into the convolutional neural network model after the first classification set is convergent, and training the second classification set until the second classification set is convergent comprise following steps:
    inputting the training sample set into the convolutional neural network model, and acquiring an excitation classification result output by the second classification set;
    comparing whether the desired classification information is consistent with the excitation classification result by using the loss stop function;
    repeatedly, cyclically and iteratively updating weights of convolutional layers between the first classification set and the second classification set until the desired classification information is consistent with the excitation classification result when the desired classification information is inconsistent with the excitation classification result; and
    maintaining the weights of the convolutional layers between the first classification set and the second classification set when the marked gender information is consistent with the gender classification result.

6. The human face image classification method according to claim 1, wherein after inputting the human face image into the pre-set convolutional neural network model, and identifying the gender information of the human face image according to the intermediate data output by the convolutional layer of the convolutional neural network model, the method further comprises following steps:
    grading a beauty score of the human face image in the range defined by the gender information according to the final data output by the convolutional layer of the convolutional neural network model, so that data for deciding a beauty score output by the convolutional neural network model comprises difference attribute data for distinguishing different genders.

7. The human face image classification method according to claim 1, wherein
    the pre-set content understanding classification comprises: image similarity comparison, race classification identification, or age identification.

8. A non-transitory computer readable storage medium, configured to store a computer program, wherein the computer program is executed to implement: the human face image classification method according to claim 1.

9. A non-transitory computer program product, wherein the computer program product is configured to, when executed, implement: the human face image classification method according to claim 1.

10. The server according to claim 9, wherein the first classification set at least comprises two fully connected layers and one classification layer; the first classification set takes intermediate data output by a penultimate convolutional layer in convolutional layers as an input signal; the second classification set comprises at least two fully connected layers and one classification layer; and the second classification set takes final data output by a last convolutional layer in the convolutional layers as an input signal.

11. The server according to claim 9, wherein the one or more application programs are further configured to form the convolutional neural network model by training through following steps:
    acquiring a training sample set marked with gender information and desired classification information;
    inputting the training sample set into the convolutional neural network model to train the first classification set until the first classification set is convergent;
    inputting the training sample set into the convolutional neural network model after the first classification set is convergent, training the second classification set until the second classification set is convergent; and
    inputting the training sample set into the convolutional neural network model after the second classification set is convergent, and finely adjusting the first classification set and the second classification set by using a pre-set learning rate until the convolutional neural network model is in a convergent state.

12. The server according to claim 11, inputting the training sample set into the convolutional neural network model to train the first classification set until the first classification set is convergent comprises following steps:

inputting the training sample set into the convolutional neural network model, and acquiring a gender classification result output by the first classification set;

comparing whether the marked gender information is consistent with the gender classification result by using a loss stop function;

repeatedly, cyclically and iteratively updating weights of convolutional layers in front of the first classification set until the marked gender information is consistent with the gender classification result when the marked gender information is inconsistent with the gender classification result; and maintaining the weights of the convolutional layers in front of the first classification set when the marked gender information is consistent with the gender classification result.

13. The server according to claim 12, wherein inputting the training sample set into the convolutional neural network model after the first classification set is convergent, and training the second classification set until the second classification set is convergent comprise following steps:

inputting the training sample set into the convolutional neural network model, and acquiring an excitation classification result output by the second classification set;

comparing whether the desired classification information is consistent with the excitation classification result by using the loss stop function;

repeatedly, cyclically and iteratively updating weights of convolutional layers between the first classification set and the second classification set until the desired classification information is consistent with the excitation classification result when the desired classification information is inconsistent with the excitation classification result; and maintaining the weights of the convolutional layers between the first classification set and the second classification set when the marked gender information is consistent with the gender classification result.

14. A server, comprising:

one or more processors;

a memory;

one or more application programs;

wherein the one or more application programs are stored in the memory and configured to be executed by the one or more processors; and the one or more application programs are configured to execute a human face image classification method comprising:

acquiring a human face image to be classified;

inputting the human face image into a pre-set convolutional neural network model, and identifying gender information of the human face image according to intermediate data output by a convolutional layer of the convolutional neural network model; and carrying out pre-set content understanding classification on the human face image in a range defined by the gender information according to final data output by the convolutional layer of the convolutional neural network model, so that data for deciding a classification result output by the convolutional neural network model comprises difference attribute data for distinguishing different genders;

wherein the convolutional neural network model comprises: a first classification set and a second classification set;

the first classification set identifies the gender information of the human face image according to the intermediate data output by the convolutional layer of the convolutional neural network model; and the second classification set carries out the pre-set content understanding classification on the human face image in the range defined by the gender information according to the final data output by the convolutional layer of the convolutional neural network model.

15. The server according to claim 14, wherein after inputting the human face image into the pre-set convolutional neural network model, and identifying the gender information of the human face image according to the intermediate data output by the convolutional layer of the convolutional neural network model, the one or more application programs are further configured to execute the human face image classification method comprising following steps:

grading a beauty score of the human face image in the range defined by the gender information according to the final data output by the convolutional layer of the convolutional neural network model, so that data for deciding a beauty score output by the convolutional neural network model comprises difference attribute data for distinguishing different genders.

16. The server according to claim 14, the pre-set content understanding classification comprises: image similarity comparison, race classification identification, or age identification.

* * * * *